(12) United States Patent
Cowles

(10) Patent No.: US 8,131,137 B1
(45) Date of Patent: Mar. 6, 2012

(54) BABY BOTTLE STEAMER

(76) Inventor: Scott R. Cowles, San Francisco, CA (US)

( * ) Notice: Subject to any disclaimer, the term of this patent is extended or adjusted under 35 U.S.C. 154(b) by 455 days.

(21) Appl. No.: 12/383,395

(22) Filed: Mar. 24, 2009

Related U.S. Application Data

(60) Provisional application No. 61/070,269, filed on Mar. 24, 2008.

(51) Int. Cl.
A61H 33/06 (2006.01)

(52) U.S. Cl. ....... 392/394; 392/386; 392/465; 99/323.3; 99/325; 99/342

(58) Field of Classification Search .................. None
See application file for complete search history.

(56) References Cited

U.S. PATENT DOCUMENTS

| 1,828,628 | A | * | 10/1931 | Torgerson | 126/261 |
|---|---|---|---|---|---|
| 1,977,482 | A | * | 10/1934 | Klause | 219/430 |
| 2,505,092 | A | * | 4/1950 | Brewer | 99/359 |
| 3,892,945 | A | * | 7/1975 | Lerner | 219/437 |
| 4,597,435 | A | | 7/1986 | Fosco, Jr. | |
| 4,614,859 | A | * | 9/1986 | Beckering et al. | 392/444 |
| 4,716,278 | A | * | 12/1987 | Cappe et al. | 219/521 |
| 4,878,588 | A | | 11/1989 | Ephraim | |
| 4,922,810 | A | | 5/1990 | Siccardi | |
| 5,063,836 | A | * | 11/1991 | Patel | 99/281 |
| 5,335,588 | A | | 8/1994 | Mahlich | |
| 5,339,725 | A | | 8/1994 | De'Longhi | |
| 5,397,031 | A | | 3/1995 | Jensen | |
| 5,473,972 | A | | 12/1995 | Rizzuto et al. | |
| 5,676,041 | A | * | 10/1997 | Glucksman et al. | 99/286 |
| 5,829,340 | A | * | 11/1998 | Yang | 99/290 |
| 6,170,386 | B1 | * | 1/2001 | Paul | 99/281 |
| 6,766,106 | B2 | * | 7/2004 | Roberson | 392/442 |
| 2002/0127005 | A1 | * | 9/2002 | Roberson | 392/442 |
| 2006/0174771 | A1 | * | 8/2006 | Frigeri | 99/279 |
| 2007/0295216 | A1 | * | 12/2007 | Williamson et al. | 99/275 |
| 2008/0041236 | A1 | * | 2/2008 | Raouf et al. | 99/323.3 |
| 2008/0141866 | A1 | * | 6/2008 | Baldacci | 99/300 |
| 2008/0160153 | A1 | * | 7/2008 | Hestekin et al. | 426/590 |
| 2009/0084269 | A1 | * | 4/2009 | Pozzari et al. | 99/275 |
| 2009/0205502 | A1 | * | 8/2009 | Carbonini | 99/280 |
| 2010/0018404 | A1 | * | 1/2010 | Villa et al. | 99/288 |
| 2010/0034942 | A1 | * | 2/2010 | Illy et al. | 426/433 |
| 2010/0229729 | A1 | * | 9/2010 | Garcia et al. | 99/281 |
| 2010/0288135 | A1 | * | 11/2010 | Reyhanloo | 99/323.3 |
| 2011/0005398 | A1 | * | 1/2011 | Garcia et al. | 99/280 |
| 2011/0023723 | A1 | * | 2/2011 | Morin et al. | 99/323.3 |
| 2011/0120316 | A1 | * | 5/2011 | Castellani et al. | 99/280 |

* cited by examiner

Primary Examiner — Thor Campbell
(74) Attorney, Agent, or Firm — Montgomery Patent & Design, LLC; Robert C. Montgomery; Joseph T. Yaksich

(57) ABSTRACT

An apparatus for steam heating a baby bottle comprising a reservoir in which water is heated by an electric resistance-type heater to produce steam, which is controlled via an on/off switch and an electronic control panel, is herein disclosed. A probe is used to measure an exact temperature of the heated liquid such as milk or formula, and displays said temperature upon a digital readout. Thus, the parent or caregiver is assured of the liquid being heated to the exact temperature without danger of burning. The apparatus is capable of heating a bottle of liquid in mere seconds in lieu of the minutes usually taken by conventional heating methods. It is envisioned that the apparatus can not only heat a bottle in a shorter period of time, but also can do so in a more consistent and accurate manner compared to current manual methods.

17 Claims, 6 Drawing Sheets

BABY BOTTLE STEAMER

RELATED APPLICATIONS

The present invention was first described in U.S. Provisional Patent Application No. 61/070,269 filed on Mar. 24, 2008, the entire disclosures of which are incorporated herein by reference.

FIELD OF THE INVENTION

The present invention relates generally to a heating apparatus for baby bottles and, more particularly, to a convenient and quick steaming apparatus to heat baby bottles.

BACKGROUND OF THE INVENTION

While caring for a baby, one of the tasks that many find trying is the process of heating a baby bottle to feed an infant. One must be aware to heat the bottle to the correct temperature and heat for an appropriate amount of time. Many methods of warming baby nursing bottles and the contained liquid exist varying in complexity from simply putting the bottle in a container of hot water, to microwaving the bottle, to using heating unit particularly suited for receiving bottle containers. A parent must be careful not to warm the bottle for too long in warm water; otherwise harmful germs might grow in the formula. Microwave heating can lead to hot spots due to the uneven heating which could burn the baby's mouth.

Recent studies suggest that mixing powdered formula with water at a temperature of at least 70 degrees Celsius (70° C.) (158 degrees Fahrenheit (158° F.)) creates a high probability that the formula will not contain the bacterium and germs which can cause bloodstream and central nervous system infections.

To obtain such a temperature often requires much time and even some return visits to the kitchen to make it just right. These steps must all be accomplished while perhaps the baby is crying and stress levels are at their highest for the parent or care provider. If others such as babysitters, siblings or grandparents should care for the baby, proper bottle heating is often a hit or miss proposition due to inexperience.

Various attempts have been made in the past to overcome these disadvantages and provide a baby nursing bottle having a means of exterior protection without the aforementioned problems. Among the relevant attempts to address these problems are several U.S. patents, including U.S. Pat. Nos. 4,597,435; 4,922,810; 5,339,725; and 5,473,972.

U.S. Pat. No. 4,878,588, issued in the name of Ephraim, describes a baby nursing bottle with temperature indicator comprising a feeding bottle having a sealed elongated chamber containing a liquid crystal strip thermometer which provides a means indicating the temperature of the bottle.

U.S. Pat. No. 5,335,588, issued in the name of Mahlich, describes a device for preparing milk froth for milk-coffee beverages comprising a superheated steam generator and a steam pipe.

U.S. Pat. No. 5,397,031, issued in the name of Jensen, describes a baby milk warmer comprising a housing which supports a bottle of water, a heater or heating selected amounts of water, a flexible tube which interconnects the bottle to the heater, and a metering valve which allows a selected amount of water to enter the heater. The heated water is added to an amount of baby formula in the bottle.

While these devices fulfill their respective, particular objectives, each of these references suffers from one or more of the aforementioned disadvantages. Accordingly, there exists a need for a means by which baby bottles can be heated in an automated and quick manner thus ensuring the utmost in quality and consistency for the baby, while reducing stress and time requirements on the parent or care provider as well. The development of the invention herein described fulfills this need.

SUMMARY OF THE INVENTION

In view of the foregoing references, the inventor recognized the aforementioned inherent problems and observed that there is a need for a baby bottle formula heating device and thus, the object of the present invention is to solve the aforementioned disadvantages.

To achieve the above objectives, it is an object of the present invention to provide a baby bottle steamer which provides a parent or caregiver the assurance that milk, formula, or other liquid is heated to an exact temperature without danger of burning for nursing a baby. The apparatus is capable of heating a bottle of liquid in mere seconds and to a more accurate temperature compared to other methods.

Another object of the present invention is to provide an apparatus comprising a reservoir in which water is heated by an electric resistance-type heater to produce steam. The apparatus is controlled via an ON/OFF switch and an electronic control panel. The steam heating process is controlled with two (2) parameters which comprise a programmable timer or temperature both of which are controlled using a thermocouple probe.

Yet still another object of the present invention is to provide an apparatus comprising a housing, a base, an internal reservoir, a heating element, a steam delivery means, a thermocouple, an ON/OFF switch, a thermocouple probe, a control panel, and an electronic display.

Yet still another object of the present invention is to provide the housing comprises internal molded partitions which form the internal fluid reservoir and a fluid level indicator along a side vertical surface.

Yet still another object of the present invention is to provide the housing comprising a hinged lid along a top horizontal surface having a knob or other manual grasping means which provides a water filling means.

Yet still another object of the present invention is to provide the steam delivery means comprising a heating element, internal steam tubing, and an external steam tube which provide a means of converting the liquid water held in the reservoir to steam and delivering the steam to the liquid within the bottle.

Yet still another object of the present invention is to provide the steam tube comprising a tubular steam conduit which is submerged into and provides a rapid heating means to the liquid, a first hinging feature which enables a user to rotate the steam tube in an upward direction for loading of the baby bottle at a convenient approach angle avoiding the likelihood of spills. The steam tube is also removably attached providing a means of washing for the sanitary removal of residue.

Yet still another object of the present invention is to provide the thermocouple probe which is situated along a vertical outer surface of the steam tube and monitors the current temperature of the liquid during the steaming process.

Yet still another object of the present invention is to provide the base comprising a wide flat lower surface which provides a stable foundation when placed on a counter, table, or other flat surface and a horizontal platform surface which provides an anti-skid surface for the baby bottle during the steam heating process.

Yet still another object of the present invention is to provide the electronic control panel comprising an electronic display which provides a user with information including settings, real time, or real temperature during the heating process of the liquid.

Yet still another object of the present invention is to provide the apparatus comprising a DC adapter, an AC adapter, a DC receptacle, and an ON/OFF switch which utilizes a 12-volt current supplied using both AC and DC power sources. Power may be provided via a removably detachable common 12-volt DC adapter cable comprising a cigarette lighter adapter and a hard-wired 110-volt power cord with an integral AC adapter/transformer.

Yet still another object of the present invention is to provide the apparatus which takes the form of a portable counter-top appliance similar to milk steamers used to froth milk in coffee shops.

Yet still another object of the present invention is to provide a method of utilizing the baby bottle steamer which provides for the quick and automatic preparation of infant bottles in a manner which keeps infants safe and happy and reduces stress and time constraints for parents and care providers.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
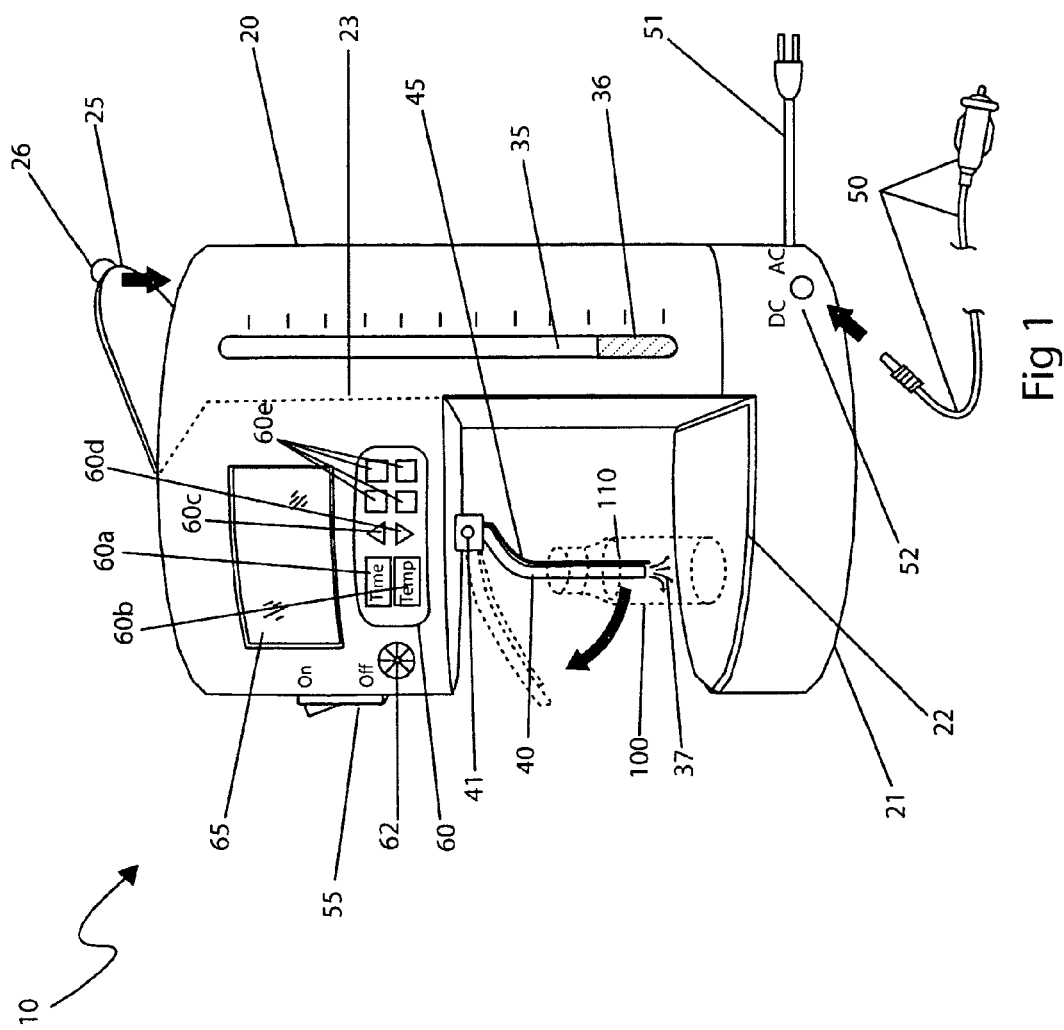
FIG. 1 is a side perspective view of a baby bottle steamer 10, according to a preferred embodiment of the present invention.
Figure 2:
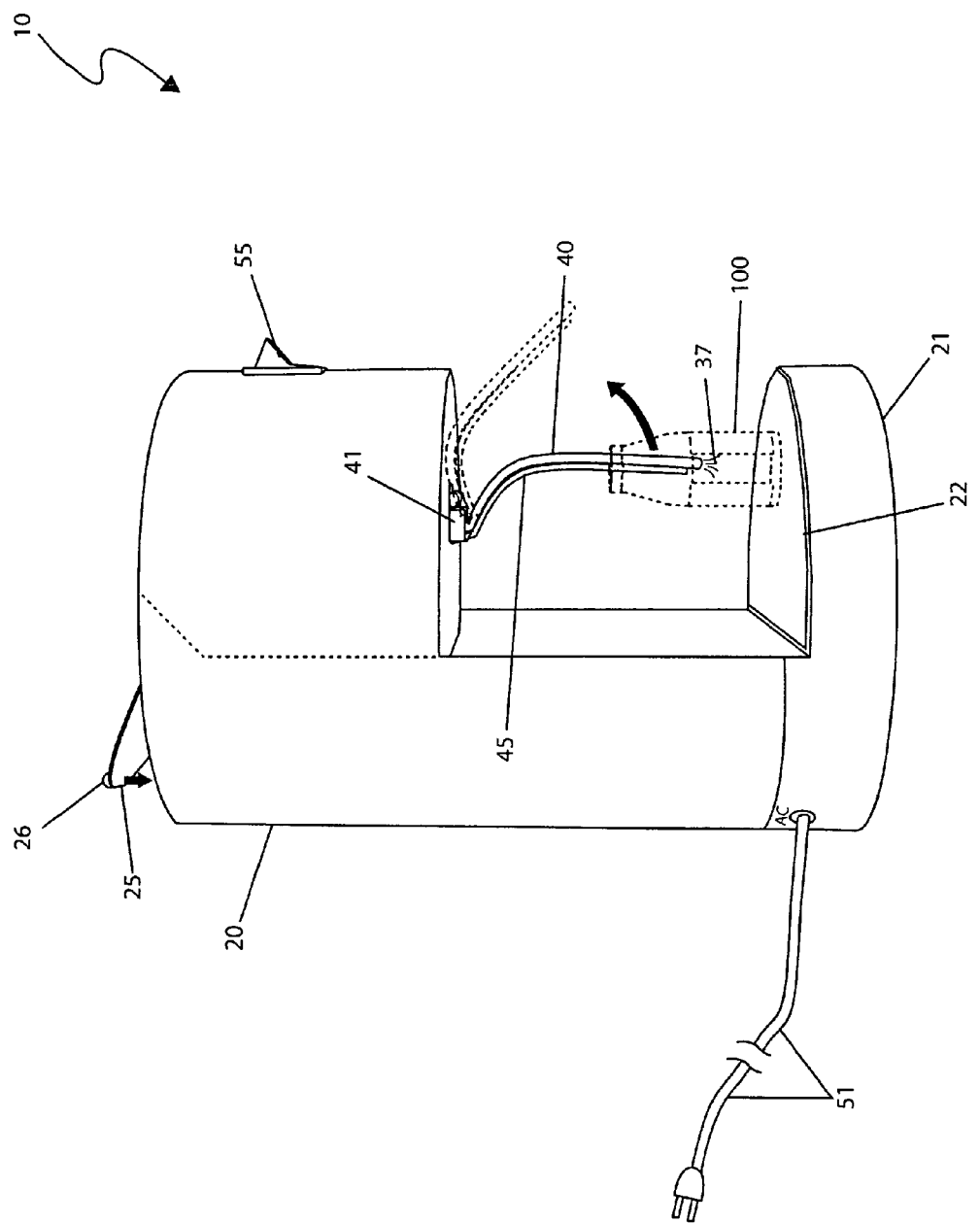
FIG. 2 is another side perspective view of a baby bottle steamer 10, according to a preferred embodiment of the present invention.
Figure 3:
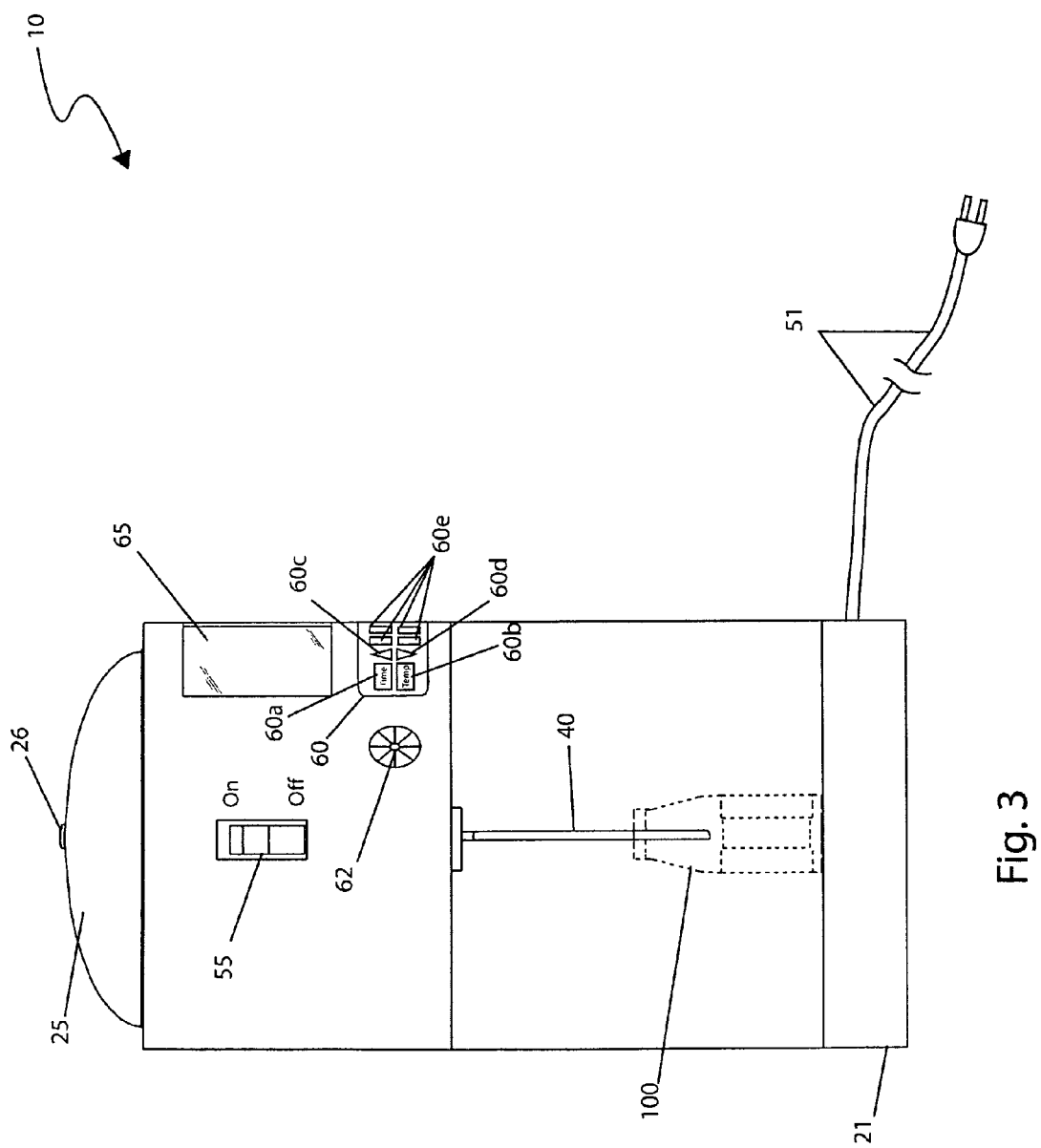
FIG. 3 is a front view of a baby bottle steamer 10, according to a preferred embodiment of the present invention.
Figure 4:
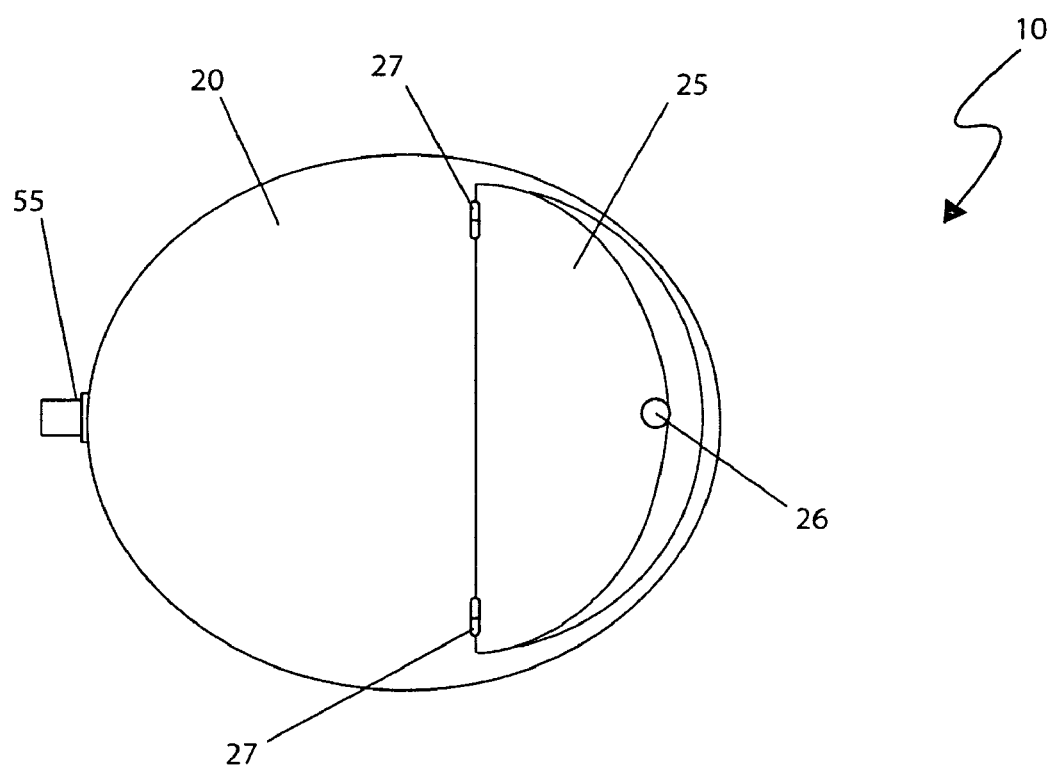
FIG. 4 is a top view of a baby bottle steamer 10, according to a preferred embodiment of the present invention.

DESCRIPTIVE KEY 10 baby bottle steamer
20 housing
21 base
22 platform
23 reservoir
24 orifice
25 lid
26 knob
27 second hinge
35 fluid level indicator
36 water
37 steam
40 steam tube
41 first hinge
45 thermocouple probe
50 direct current (DC) adapter
51 alternating current (AC) adapter
52 DC receptacle
55 ON/OFF switch
56 heater coil
58 internal tube
60 control panel
60a time mode
60b temperature mode
60c incrementing button
60d decrementing button
60e control button
62 speaker
65 display
100 bottle
110 liquid

DETAILED DESCRIPTION OF THE PREFERRED EMBODIMENT

The best mode for carrying out the invention is presented in terms of its preferred embodiment, herein depicted within FIGS. 1 through 6. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an apparatus and method for a baby bottle steamer (herein described as the "apparatus") 10, comprising a reservoir 22 in which water is heated by an electric resistance-type heater 56 to produce steam 37 controlled via an on/off switch 55 and an electronic control panel 60. The steam heating process is controlled with two (2) parameters which comprise a programmable timer mode 60b and/or temperature mode 60a both of which are controlled using a thermocouple probe 45. An electronic display 65 provides a user with information including settings, real time, and/or real temperature during heating of liquid 110. Thus, a parent or caregiver is assured of milk or other liquid 110 being heated to an exact temperature without danger of burning. The apparatus 10 is capable of heating a bottle of liquid 110 in mere seconds in lieu of several minutes using conventional heating methods. The apparatus 10 can also heat a liquid 110 to a more accurate temperature compared to manual methods.

Referring now to FIGS. 1 through 4, side, top, and front views of the apparatus 10, according to the preferred embodiment of the present invention, are disclosed. The apparatus 10 comprises a housing 20, a base 21, a platform 22, an internal reservoir 23, a steam tube 40, a thermocouple 45, an ON/OFF switch 55, a thermocouple probe 45, a control panel 60, and an electronic display 65. The apparatus 10 takes the form of a portable counter-top appliance similar to milk steamers used to froth milk in coffee shops; however, the invention 10 provides enhancements resulting in reduced heating time and accurate liquid 110 temperatures.

The housing 20 provides a rugged shock-resistant and protective plastic enclosure approximately eight (8) to twelve (12) inches tall further comprising a base 21, an internal water reservoir 23, and a lid 25. The housing 20 comprises a generally cylindrically-shaped vessel further comprising a large opening at a front central location being similar thereto common coffee makers providing sufficient dimensions so as to receive a full-size standing baby bottle 100 therein.

The base portion 21 comprises a wide flat lower surface providing a stable foundation thereto the apparatus 10 when placed thereupon a counter, table, or other flat surface during use. The base 21 further comprises a platform 22 along an upper horizontal surface thereof providing an anti-skid surface of rubber or plastic thereto a baby bottle 100 during the steam heating process. The housing 20 further comprises internal molded partitions forming an internal fluid reservoir 23 capable of holding approximately five (5) to ten (10) cups of water, thereby reducing a frequency of refilling the reservoir 23 during use. The housing 20 also comprises a fluid level indicator 35 along a side vertical surface. The fluid level indicator 35 provides a viewing means thereto a current water level 36 therewithin the reservoir 23 via a graduated transparent vertical column.

The housing 20 further comprises a lid 25 therewith a standard second hinge 27 along a top horizontal surface providing a water 36 filling means thereto the apparatus 10. Said lid 25 is fabricated of a similar plastic material as the housing 20 providing a knob 26 or other manual grasping means in an expected manner.

Figure 5:
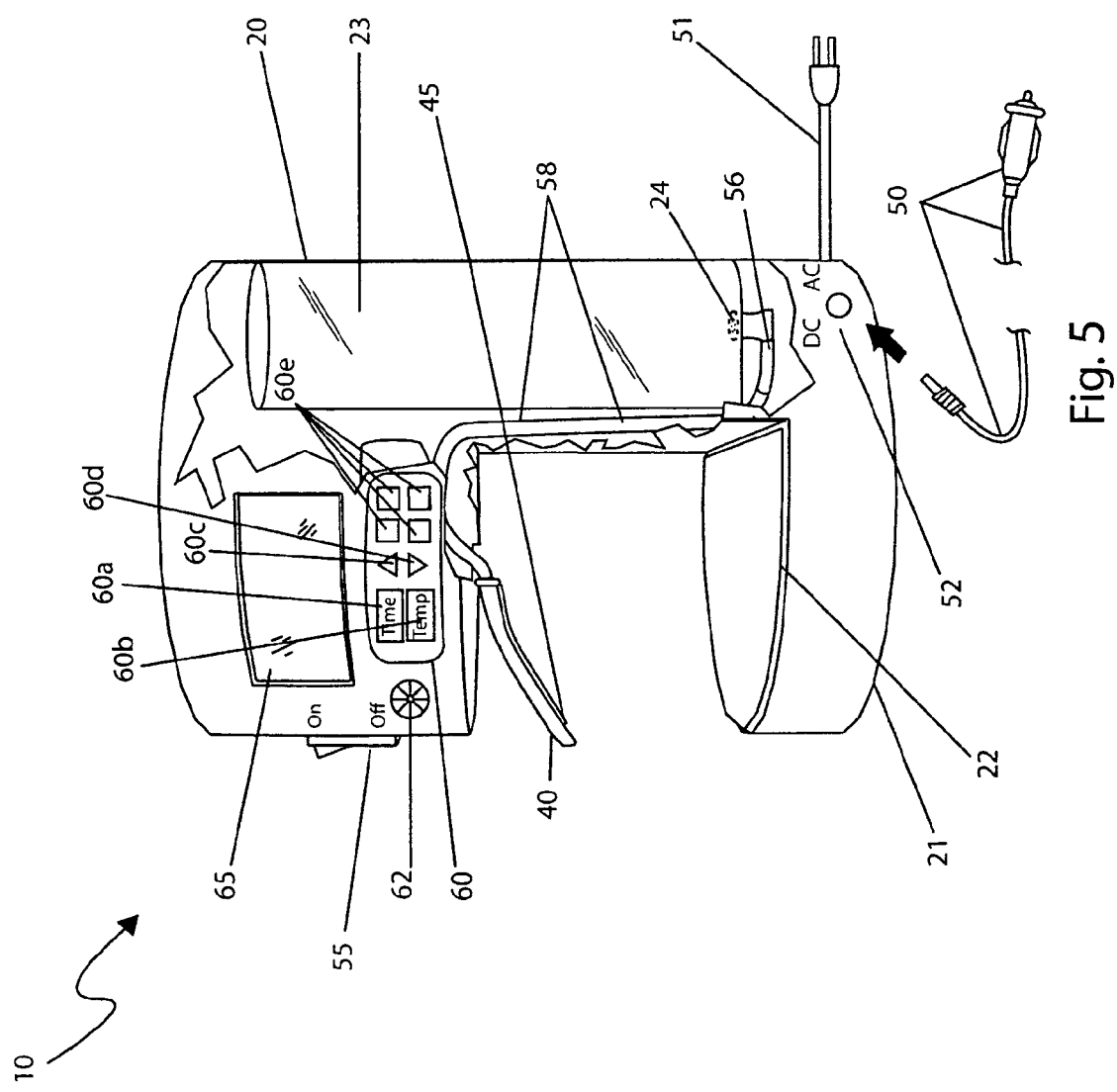
FIG. 5 is a side perspective cut-away view of the baby bottle steamer 10, according to a preferred embodiment of the present invention; and, FIG. 6 is an electrical block diagram of the baby bottle steamer 10, according to a preferred embodiment of the present invention.

Referring now to FIG. 5, a side perspective cut-away view of the apparatus 10, according to the preferred embodiment of the present invention, is disclosed. During the steam heating process, said water 36 is heated and converted into steam 37 via an internal heating coil 56 (see FIG. 6). Said steam 37 is in turn propelled therethrough stainless steel internal tubing 58 through a stainless steel steam tube 40 which extends downwardly therewithin a baby bottle 100 positioned upon the platform 22 and filled with a liquid 110, preferably milk or formula. As the apparatus 10 is positioned to an 'ON' position via an ON/OFF switch 55 the heating coil 56 is activated and begins to heat. The heating coil 56 then accepts a liquid 110 from an orifice 24 located at a bottom portion of the reservoir 23. As the liquid 110 passes through the heating coil 56 said liquid 110 is heated to a user desired temperature. The freshly heated liquid is pushed through the internal tube 58 thereinto the steam tube 40. The steam tube 40 comprises a tubular steam conduit which is submerged thereinto the liquid 110 providing rapid heating means thereto. The steam tube 40 provides a first hinging feature 41 to enable a user to rotate said steam tube 40 in an upward direction allowing loading of a baby bottle 100 thereupon the platform 22 at a convenient approach angle, thereby avoiding possible spilling of the liquid 110 during loading. The steam tube 40 is also removably attached thereto the first hinge 41 via an inference fitting means, thereby providing a washing means thereto said steam tube 40 for the sanitary removal of residue resulting therefrom the liquid 110 after use.

The first hinge 41 also enables the user to rotate a thermocouple probe 45 in an upward position as like the steam tube 40. The thermocouple probe 45 routed through the housing 20 and the first hinge 41 and situated along a vertical outer surface of the steam tube. The thermocouple probe 45 monitors a current temperature of the liquid 110 during the heating process. Said thermocouple probe 45 is wiped clean when necessary for the sanitary removal of residue resulting therefrom the liquid 110 after use.

The duration and temperature of the steam heating process is set, controlled, and displayed via an electronic control panel 60 and an electronic display 65 both affixed along a front portion of the housing 20 as shown. The housing 20 further provides an ON/OFF switch 55 also conveniently located along an upper front surface of said housing 20.

Figure 6:
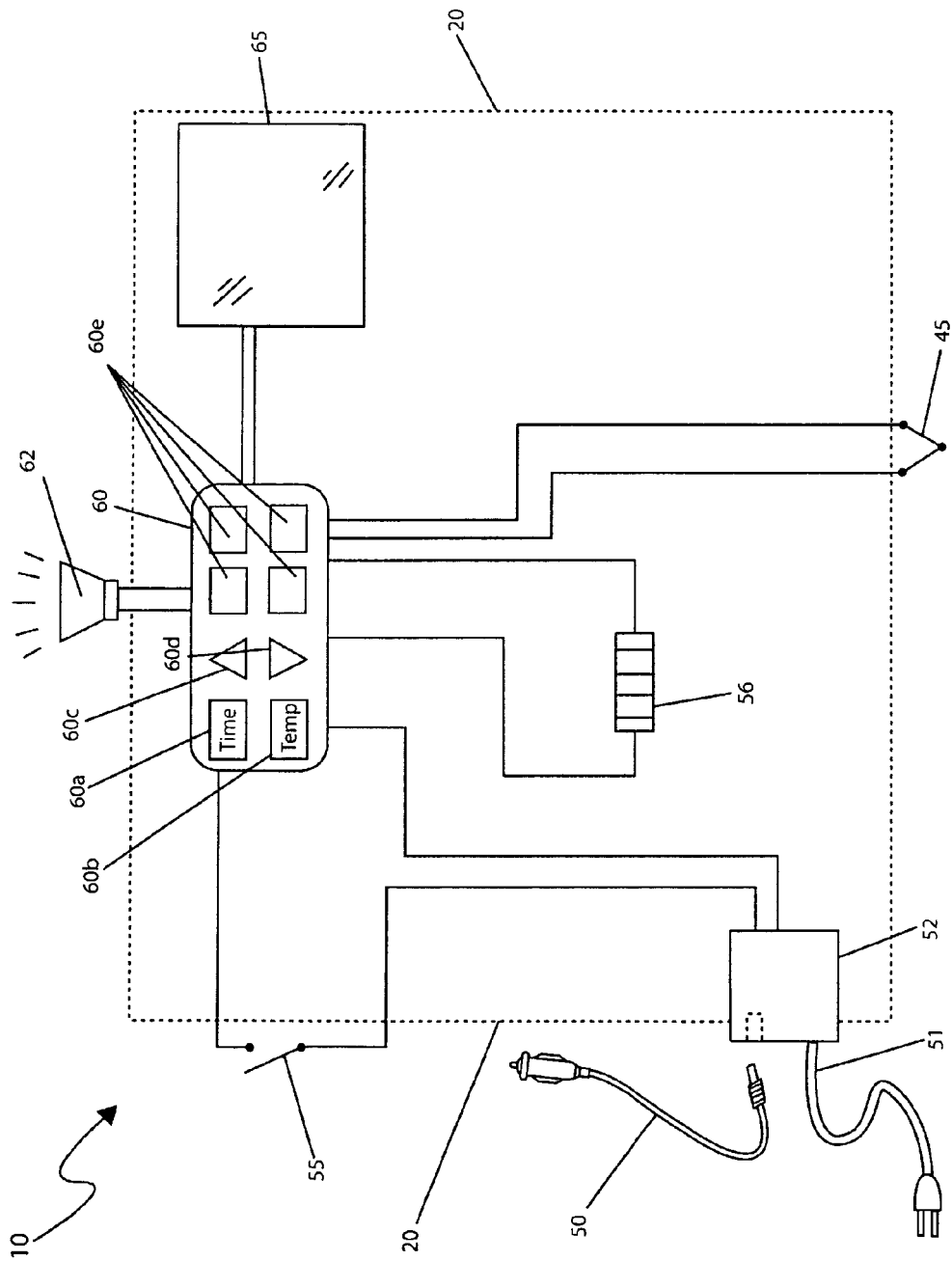

Referring now to FIG. 6, an electrical block diagram of the apparatus 10, according to the preferred embodiment of the present invention, is disclosed. The apparatus 10 comprises a DC adapter 50, an AC adapter 51, a DC receptacle 52, an ON/OFF switch 55, a control panel 60, an electronic display 65, a thermocouple probe 45, and a heating coil 56. The apparatus 10 is utilizes a 12-volt current being supplied using both AC and DC power sources. Power may be provided via a removably detachable common 12-volt DC adapter cable 50 comprising of a standard cigarette lighter adapter, thereby providing convenient portable use of the apparatus 10 within a vehicle. Said DC adapter cable 50 is in turn inserted therein the DC receptacle 52 located and stationarily mounted thereat a lower rear portion of the housing 20. The DC receptacle 52 further comprises a hard-wired 110-volt power cord with an integral AC adapter/transformer 51 being common in the industry suitable for plugging thereinto a conventional AC duplex outlet in an expected manner.

The abovementioned 12-volt power is in turn routed internally thereto the ON/OFF switch 55 providing a normal power disconnect function. Said ON/OFF switch 55 is preferably a toggle switch, yet other switches may be incorporated therewithout limiting the function of the invention. Internal wiring conducts said 12-volt power thereto the control panel 60 which comprises electrical and electronic devices such as, but not limited to: a time mode 60a, a temperature mode 60b, an incrementing button 60c, a decrementing button 60d, a plurality of control buttons 60e, a miniature piezo speaker 62, circuit boards, a micro-processor, relays, software, display drivers, and the like. The control panel 60 works in conjunction therewith an adjacent electronic display 65 which comprising an LED, LCD, or other current display technology. Both the control panel 60 and the electronic display 65 are mounted flush thereto an upper portion of the housing 20 at a convenient viewing and operating location.

The control panel 60 comprises a plurality of digit-operated push buttons and controls, thereby providing control and status display of various steam heating functions such as a time mode 60a which provides functions thereto set the time or program a timer. The control panel also comprises a temperature mode 60b, thereby providing functions to program a desired temperature for the heating process. Said control panel 60 further comprises an incrementing button 60c and decrementing button 60d, thereby allowing the user to regulate the time mode 60a and temperature mode 60b controls. Said control panel 60 also comprises a plurality of integral control buttons 60e which provide various software input functions such as, but not limited to: numerical input, enter/cancel functions, start/stop functions, and the like. The current temperature of the liquid 110 being heated is monitored during the heating process via the thermocouple probe 45. Upon programmed or selected activation of the steam heating process, a DC current is provided therefrom the control panel 60 thereto a heating coil 56 producing steam 37 to heat the liquid 110 contained therein the baby bottle 100.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be utilized as indicated in FIGS. 1 through 4.

The method of utilizing the apparatus 10 may be achieved by performing the following steps: plugging the AC adapter 51 thereinto a common AC duplex outlet or, alternately, plugging the DC adapter 50 thereinto the DC receptacle 52 and a vehicle's cigarette lighter socket; preparing one (1) or more baby bottles 100 with a desired volume of liquid 110; rotating the first hinge portion 41 of the steam tube 40 and thermocouple probe 45 to an upward position, thereby allowing easy insertion of the baby bottle 100 thereinto the apparatus 10; rotating the steam tube 40 and thermocouple probe 45 to a downward position; resting the baby bottle 100 thereon the anti-skid platform surface 22; providing power thereto the apparatus 10 using the ON/OFF switch 55; programming a particular steam heating process using the temperature mode 60b, incrementing button 60c, decrementing button 60d, and control buttons 60e located upon the control panel 60; entering particular desired steam heating parameters using the time mode 60a, incrementing button 60c, decrementing button 60d, and control buttons 60e located upon the control panel 60; observing and verifying said heating settings thereupon the display 65; initiating a desired heating process using the control buttons 60e wherein the heating coil 56 produces steam 37 therefrom the water 36, wherein the steam 37 travels upward through the internal tube 58, through the steam tube 40, and into the liquid 110 in the bottle 100; waiting for a period of time during heating of the liquid 110 wherein the thermocouple probe 45 produces a current proportional to the heat of the liquid 110 until it senses a temperature relative to the desired heating process; observing a visual indicator displayed thereupon the display 65 or hearing the piezo speaker 62, thereby communicating completion of the heating cycle; deactivating the apparatus 10 using the ON/OFF switch 55; waiting for any residual steam 37 to escape therefrom the steam tube 40; grasping the baby bottle 100; rotating the steam tube 40 slightly outward; removing the baby bottle 100 therefrom the platform 22; dispensing and consuming the liquid 110 as desired; repeating the above steps for additional baby bottles 100 as needed; removing the steam tube 40 and thermocouple probe 45 for washing as required; and, appreciating the time saved while preparing accurately heated liquid 110 using the present invention 10.

The method of utilizing the apparatus 10 as described above, wherein the desired heating process further comprises a plurality of control buttons 60e, thereby providing various digit-operated software input functions. Said input functions may include numeric data input, preprogrammed recipe selection, process step selection, an enter function to accept the user's desired process, a cancel function thereto annul the user's desired process, a pause function thereto postpone the user's desired process, a start function thereto begin the user's process, and a stop function thereto discontinue the user's desired process.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A heating device for heating a bottle filled with a liquid, comprising:
    a housing, comprising a base and an internal reservoir for retaining water therewithin;
    a heating means for heating said water within said reservoir to produce steam;
    a delivery means in fluid communication therewith said reservoir therefor delivering said steam thereto said bottle; and,
    a control means for controlling said heating means and said delivery means, further comprising a desired programmable function entered by a user;
    wherein said device heats said bottle thereto a desired temperature in a minimal amount of time and with an increased accuracy;
    wherein said housing comprises integrally molded components further comprising:
        said reservoir located of a rear portion of said base and comprising an upstanding rear vertical wall;
        a hinged lid along a top horizontal surface of said reservoir, comprising a gripping means and providing access to said reservoir;
        a front portion located at a top front location of said reservoir, further comprising said control means; and;
        a bottle loading area defined between said base and said front portion;
    wherein said delivery means further comprises:
        internal steam tubing in fluid communication with said reservoir at a proximal end;
        an external steam tube in fluid communication with a distal end of said internal steam tube; and,
        a hinging feature hingedly and removably attaching said external steam tube to a central location of a bottom surface of said front portion of said housing; and,
    wherein said internal steam tubing delivers said steam from said reservoir to said external steam tube;
    wherein said external steam tube delivers said steam to said bottle and said liquid, thereby initiating a steaming process;
    wherein said hinging feature enables a user to rotate said external steam tube in an upward direction for loading of said bottle at a convenient approach angle;
    wherein said hinging feature enables said external steam tube to be removed, thereby providing a sanitation means;
    wherein said hinged lid allows said reservoir to be manually filled with said water; and,
    wherein said bottle loading area comprises a height large enough to accommodate conventional feeding bottles.

2. The device of claim 1, wherein said base further comprises a wide flat lower surface, thereby providing a stable foundation when placed thereon a horizontal surface.

3. The device of claim 2, further comprising an anti-skid platform thereof a top surface thereof said base.

4. The device of claim 1, further comprising a fluid level indicator along a side vertical surface thereof said housing, thereby providing a means to view an amount of water within said reservoir.

5. The device of claim 1, wherein said heating means further comprises an electric resistance-type heater to produce said steam.

6. The device of claim 1, further comprising a thermocouple probe in electronic communication therewith said control means, routed therethrough said hinging feature, and situated along a vertical outer surface of said external steam tube;

wherein said thermocouple probe and monitors a current temperature of said liquid therein said bottle during said steaming process.

7. The device of claim 6, wherein said control means further comprises an electronic control panel located thereon an outer front surface thereof said front portion thereof said housing, thereby providing said desired programmable function thereto said device.

8. The device of claim 7, wherein said electronic control panel further comprises:
an electronic display which provides a visual display thereof a desired programmable function;
an electronic clock displayed thereon said electronic display;
a plurality of programmable feature keys for entering said desired programmable function;
a speaker for audibly alerting when said desired programmable function is completed; and,
an ON/OFF power switch for providing power therefrom a power source thereto said device.

9. The device of claim 8, further comprising a removably detachable automobile cigarette lighter adapter in electrical communication therewith said ON/OFF power switch.

10. The device of claim 8, further comprising a power cord with an integral AC adapter/transformer in electrical communication therewith said ON/OFF power switch.

11. The device of claim 8, wherein said desired programmable function further include:
an incrementing and a decrementing button providing an entering means thereto a timer function, wherein said heating process commences at a desired time and a desired temperature function, wherein said heating process proceeds until said desired temperature is achieved;
an enter function for commencing said desired programmable function;
a cancel function for canceling said programmable functions;
a clock setting function for setting a desired clock setting;
a start function for commencing said heating process;
a pause function for pausing said heating process; and,
a stop function for ceasing said heating process;
wherein said thermocouple probe provides a feedback thereto said electronic control panel when said desired temperature has been achieved.

12. A method of heating a bottle filled with a liquid thereto a desired temperature with a programmable bottle heating device producing a heating process comprises the steps of:
providing said heating device, further comprising:
a housing, comprising a reservoir located thereof a rear portion thereof a base and comprising an upstanding rear vertical wall with a fluid level indicator along a side vertical surface thereof, a hinged lid along a top horizontal surface thereof said reservoir, comprising a gripping means and providing access thereto said reservoir, a front portion located at a top front location thereof said reservoir, and a bottle loading area defined therebetween said base and said front portion;
a heating means for heating said water within said reservoir to produce steam;
internal steam tubing in fluid communication therewith said reservoir at a proximal end;
an external steam tube in fluid communication therewith a distal end of said internal steam tube; and,
a hinging feature hingedly and removably attaching said external steam tube thereto a central location thereof a bottom surface thereof said front portion thereof said housing;
an electronic control panel located thereon an outer front surface thereof said front portion thereof said housing, further comprising:
an electronic display which provides a visual display thereof a desired programmable function;
an electronic clock displayed thereon said electronic display;
a plurality of programmable feature keys thereby initiating said desired programmable function;
a speaker for audibly alerting when said desired programmable function is completed; and,
an ON/OFF power switch for providing power therefrom a power source thereto said device;
a thermocouple probe in electronic communication therewith said control means, routed therethrough said hinging feature, and situated along a vertical outer surface of said external steam tube;
providing power therefrom said power source thereto said device;
adding a desired amount of water therein said reservoir;
preparing one (1) or more bottles with a desired volume of liquid;
rotating said hinging feature upward such that said external steam tube and said thermocouple probe is at an upward position;
inserting said external steam tube and said thermocouple thereinto said bottle
rotating said hinging feature downward such that said external steam tube and said thermocouple probe to a downward position such that said bottle is fully within said bottle loading area;
resting said bottle thereon a top portion thereof said base;
switching said ON/OFF power switch thereto an "ON" position;
entering said desired programmable function thereto said device thereby said plurality of programmable feature keys to commence said heating process;
observing and verifying said desired programmable function thereupon said electronic display;
initiating said heating process, wherein said heating means heats said water therein said reservoir to produces steam, wherein said steam travels through said internal steam tubing, said external steam and into said bottle, and wherein said thermocouple probe monitors said temperature therein said bottle;
ceasing said heating process directed thereby said desired programmable function;
observing a visual indicator displayed thereupon said electronic display when said heating process is completed;
audibly hearing said speaker when said heating process is completed;
switching said ON/OFF switch thereto an "OFF" position;
waiting for any residual steam to escape therefrom said external steam tube;
grasping said bottle;
rotating said hinging feature upward such that said external steam tube and said thermocouple probe is at an upward position;
removing said bottle therefrom said external steam tube and said thermocouple probe;
dispensing and consuming said liquid therein said bottle; and,
repeating the above steps for subsequent bottles.

13. The method of claim 12, further comprising the steps of:
   removing said external steam tube and said thermocouple probe therefrom said hinging feature for cleaning and sanitation.

14. The method of claim 12, wherein said step of providing power therefrom said power source thereto said device further comprises removably detaching an automobile cigarette lighter adapter thereto said device.

15. The method of claim 12, wherein said step of providing power therefrom said power source thereto said device further comprises connecting a power cord with an integral AC adapter/transformer thereto an electrical wall socket.

16. The method of claim 12, wherein said step of entering said desired programmable function further comprises the steps of:
   entering a timer function, wherein said heating process commences at a desired time therewith an incrementing and a decrementing button;
   entering a desired temperature function, wherein said heating process proceeds until said desired temperature is achieved therewith said incrementing and said decrementing button;
   entering an enter function for commencing said desired programmable function;
   entering a cancel function for canceling said desired programmable function;
   entering a clock setting function for setting a desired clock setting;
   entering a start function for commencing said heating process;
   entering a pause function for pausing said heating process; and,
   entering a stop function for ceasing said heating process;
   wherein said thermocouple probe provides a feedback thereto said electronic control panel when said desired temperature has been achieved.

17. The method of claim 12, further comprising an anti-skid platform thereof a top surface thereof said base, thereby providing a stable means of placing said bottle thereon said base.

* * * * *